(12) United States Patent
Kurata

(10) Patent No.: US 10,947,860 B2
(45) Date of Patent: Mar. 16, 2021

(54) ACTUATOR

(71) Applicant: ISUZU MOTORS LIMITED, Tokyo (JP)

(72) Inventor: Iori Kurata, Chigasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 194 days.

(21) Appl. No.: 15/999,433

(22) PCT Filed: Feb. 16, 2017

(86) PCT No.: PCT/JP2017/005772
§ 371 (c)(1),
(2) Date: Mar. 12, 2019

(87) PCT Pub. No.: WO2017/142038
PCT Pub. Date: Aug. 24, 2017

(65) Prior Publication Data
US 2019/0234229 A1 Aug. 1, 2019

(30) Foreign Application Priority Data

Feb. 19, 2016 (JP) .............................. JP2016-030425

(51) Int. Cl.
*F01D 17/12* (2006.01)
*F02B 37/12* (2006.01)
(Continued)

(52) U.S. Cl.
CPC ............ *F01D 17/12* (2013.01); *F01D 17/20* (2013.01); *F02B 37/12* (2013.01); *F02B 37/18* (2013.01);
(Continued)

(58) Field of Classification Search
CPC ...... F02B 37/18; F02B 37/183; F02B 37/186; F02B 37/12; F02B 37/24; F01D 17/12;
(Continued)

(56) References Cited

U.S. PATENT DOCUMENTS 4,656,834 A * 4/1987 Elpern .................. F02B 37/183
60/602
4,893,474 A * 1/1990 Miller ..................... F02B 37/18
60/602
(Continued)

FOREIGN PATENT DOCUMENTS

CN 103415683 A 11/2013
CN 104471208 A 3/2015
(Continued)

OTHER PUBLICATIONS

An English Machine Translation to Ogawa Masato et al. (Pub. Number JP 2015-045295 A), published on Mar. 12, 2015.*
(Continued)

*Primary Examiner* — Thai Ba Trieu
(74) *Attorney, Agent, or Firm* — Procopio, Cory, Hargreaves & Savitch LLP

(57) ABSTRACT

An actuator actuates a movable part of a turbocharger including a turbine housing for accommodating a turbine driven by exhaust, and a compressor housing for accommodating a compressor which is disposed on the same axis as the turbine and which pressure-feeds intake air. The actuator has a rod of which one end side is coupled by a link to the movable part, a case having a bearing part that slidably and axially supports the other end side of the rod, a boot which covers the sliding part of the rod and the bearing part and of which at least part of the outer peripheral surface faces the
(Continued)

outer peripheral surface of the turbine housing, and a thermal shield member disposed between the turbine housing and the boot.

3 Claims, 4 Drawing Sheets

(51) Int. Cl.
  *F02B 37/18* (2006.01)
  *F16C 33/74* (2006.01)
  *F16J 3/04* (2006.01)
  *F16J 15/52* (2006.01)
  *F02C 6/12* (2006.01)
  *F01D 17/20* (2006.01)
  *F02B 37/24* (2006.01)

(52) U.S. Cl.
  CPC ............ *F02B 37/186* (2013.01); *F02B 37/24* (2013.01); *F02C 6/12* (2013.01); *F16C 33/74* (2013.01); *F16J 3/04* (2013.01); *F16J 15/52* (2013.01); *F05D 2220/40* (2013.01); *Y02T 10/12* (2013.01)

(58) Field of Classification Search
  CPC ... F01D 17/20; F02C 6/12; F16C 33/74; F16J 3/04; F16J 15/52; F05D 2220/40; Y02T 10/144
  USPC ........................................ 60/602; 251/66, 68
  See application file for complete search history.

(56) References Cited

U.S. PATENT DOCUMENTS

| | | | |
|---|---|---|---|
| 7,423,421 B2* | 9/2008 | Reichert | F15B 15/10 324/207.2 |
| 2005/0217266 A1* | 10/2005 | Noelle | F02B 37/24 60/602 |
| 2013/0168582 A1* | 7/2013 | Webster | F16K 31/54 251/250 |
| 2014/0174075 A1* | 6/2014 | Garcia Alcaraz | F02B 37/186 60/602 |
| 2015/0004020 A1* | 1/2015 | Lombard | F01D 17/105 417/406 |
| 2015/0226221 A1 | 8/2015 | Kraemer et al. | |
| 2015/0267605 A1* | 9/2015 | Lombard | F02B 37/183 60/602 |
| 2015/0285132 A1 | 10/2015 | Chekansky et al. | |
| 2016/0146098 A1* | 5/2016 | Dilalan | F02B 37/186 251/228 |
| 2017/0370279 A1* | 12/2017 | Stilgenbauer | F02B 37/183 |

FOREIGN PATENT DOCUMENTS

| | | | | |
|---|---|---|---|---|
| DE | 10 2014 217333 A1 | 3/2015 | | |
| JP | 2009-114928 A | 5/2009 | | |
| JP | 2010-196783 A | 9/2010 | | |
| JP | 2015-045295 A | 3/2015 | | |
| WO | 2012-128957 A2 | 9/2012 | | |
| WO | WO-2013068147 A1 * | 5/2013 | ............ | F23R 3/002 |
| WO | 2013/180962 A1 | 12/2013 | | |

OTHER PUBLICATIONS

Extended European Search Report for related EP Application No. 17753293.4, dated Nov. 23, 3018; 8 pages.
First Office Action for related CN App. No. 201780011978.X dated Jan. 7, 2020; English translation provided. 18 pages.
International Search Report and Written Opinion for related International Application No. PCT/JP2017/005772, dated May 9, 2017; English translation of ISR provided; 8 pages.

* cited by examiner

ACTUATOR

CROSS-REFERENCE TO RELATED APPLICATIONS

This application is a U.S. National Stage entry of PCT Application No: PCT/JP2017/005772 filed on Feb. 16, 2017, which claims priority to Japanese Patent Application No. 2016-030425, filed Feb. 19, 2016, the contents of which are incorporated herein by reference.

TECHNICAL FIELD

The present disclosure relates to an actuator, particularly to an actuator for actuating a movable part of a turbocharger.

BACKGROUND ART

An actuator for actuating a movable part such as a variable nozzle or a wastegate valve is conventionally attached to a turbocharger mounted on an engine. This type of actuator generally includes a rod that is coupled by a link to a movable part of a turbocharger, a case including a bearing part that slidably and axially supports the rod, and a diaphragm etc. that is accommodated in the case.

A gap exists of the rod of the actuator and the bearing part of the case, particularly when the actuator is attached to a lower side of the turbocharger. Accordingly, water and dust are likely to enter the case from the gap, and the diaphragm etc. in the case may be corroded or broken down. Therefore, a technique for effectively preventing water and dust from entering is put into practice by covering a sliding part of the rod and the bearing part with a boot etc. (See, for example, Patent Document 1.).

CITATION LIST

Patent Document

Patent Document 1: JP-A-2010-196783

SUMMARY OF THE INVENTION

Technical Problem

When the actuator is disposed adjacent to the turbocharger, there is a problem of thermal degradation of the boot as temperature in vicinity of a turbine housing becomes high due to an influence of exhaust gas flowing in the turbine housing. When the actuator is attached to be separated from the turbocharger to prevent the thermal degradation, there is also a problem that mountability of the actuator is deteriorated due to a constraint on space in vicinity of the engine.

An object of the disclosure is to effectively prevent thermal degradation of the boot of the actuator.

Solution to Problem

The present disclosure provides an actuator that actuates a movable part of a turbocharger including a turbine housing configured to accommodate a turbine driven by exhaust gas and a compressor housing configured to accommodate a compressor disposed on the same axis as the turbine and pressure-feeding intake air, the actuator including:
  a rod configured to be coupled by a link to the movable part on one end side;
  a case including a bearing part configured to slidably and axially support the other end side of the rod;
  a boot configured to cover a sliding part of the rod and the bearing part such that at least a part of an outer peripheral surface of the boot faces an outer peripheral surface of the turbine housing; and
  a thermal shield member configured to be disposed between the turbine housing and the boot.

The thermal shield member preferably includes a vertical wall part configured to cover the outer peripheral surface of the boot facing at least the turbine housing and a flange part configured to cover a tip end side of the boot.

The vertical wall part may be formed in a cylindrical shape to cover the entire outer peripheral surface of the boot.

The actuator may further include a bracket for mounting the case such that the case is adjacent to at least one of the turbine housing and the compressor housing and that the rod and at least a tip end side of the boot are inserted between the turbine housing and the compressor housing.

A turbocharger system according to the disclosure includes:
  a turbocharger that includes:
    a turbine housing configured to accommodate a turbine driven by exhaust gas;
    a compressor housing configured to accommodate a compressor disposed on the same axis as the turbine and pressure-feeding intake air; and
    a movable part for controlling the turbocharger; and
  an actuator that includes:
    a rod configured to be coupled by a link to the movable part on one end side;
    a case including a bearing part configured to slidably and axially support the other end side of the rod;
    a boot configured to cover a sliding part of the rod and the bearing part such that at least a part of an outer peripheral surface of the boot faces an outer peripheral surface of the turbine housing; and
    a thermal shield member configured to be disposed between the turbine housing and the boot.

The movable part may be disposed between the turbine housing and the compressor housing.

The turbocharger system may further include a bracket for fixing the case member to the compressor housing.

The thermal shield member may include a vertical wall part configured to cover the outer peripheral surface of the boot facing at least the turbine housing and a flange part configured to cover a tip end side of the boot.

The vertical wall part may be formed in a cylindrical shape to cover the entire outer peripheral surface of the boot.

Advantageous Effect's of the Invention

According to the present disclosure, thermal degradation of the boot of the actuator can be effectively prevented.

DESCRIPTION OF EMBODIMENTS

Figure 1:
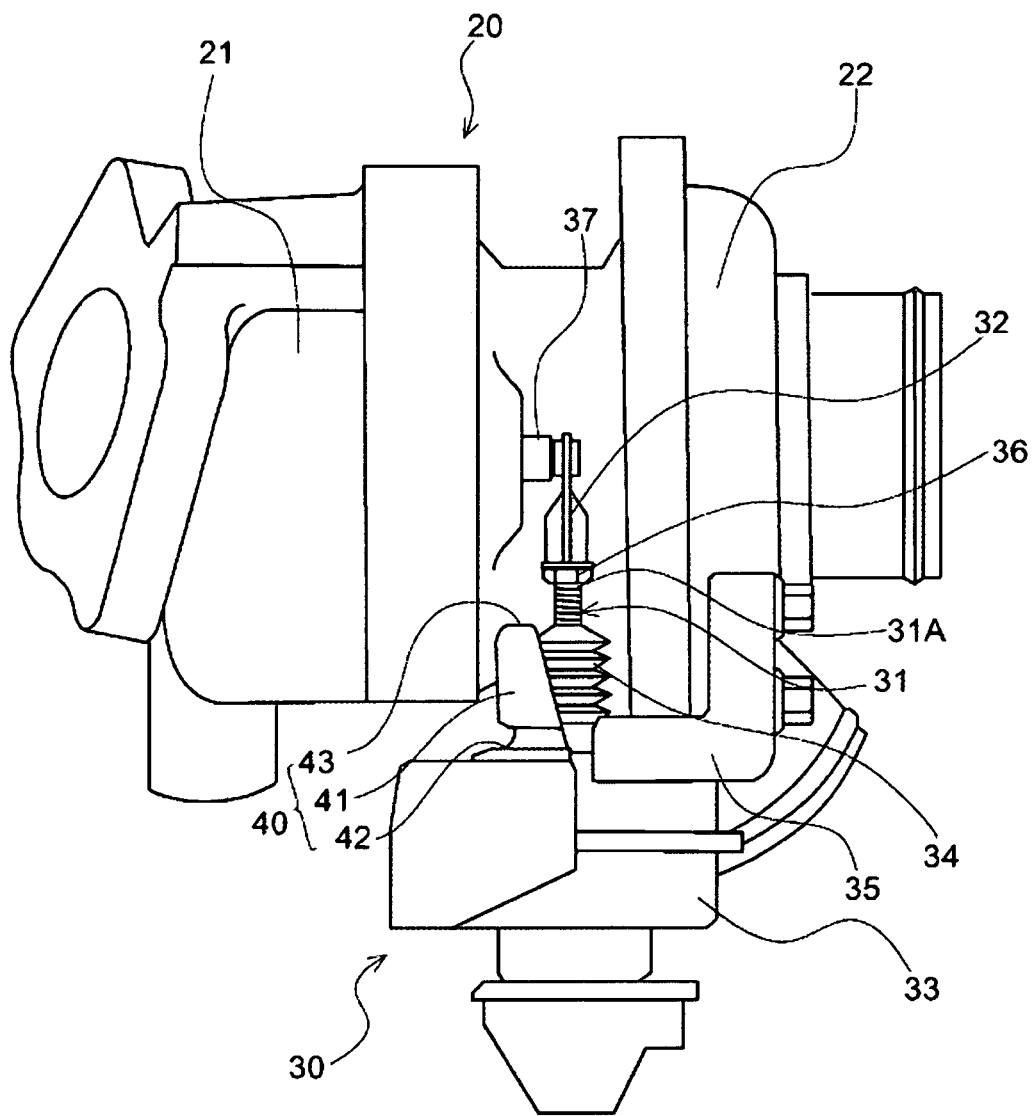
FIG. 1 is a schematic side view illustrating an actuator and a turbocharger according to a first embodiment.

Hereinafter, an actuator according to embodiments of the present disclosure is described with reference to drawings. The same components are denoted by the same reference numerals, and names and functions of these components are also the same. Therefore, detailed descriptions of the same components are not repeated.

FIRST EMBODIMENT

Figure 2:
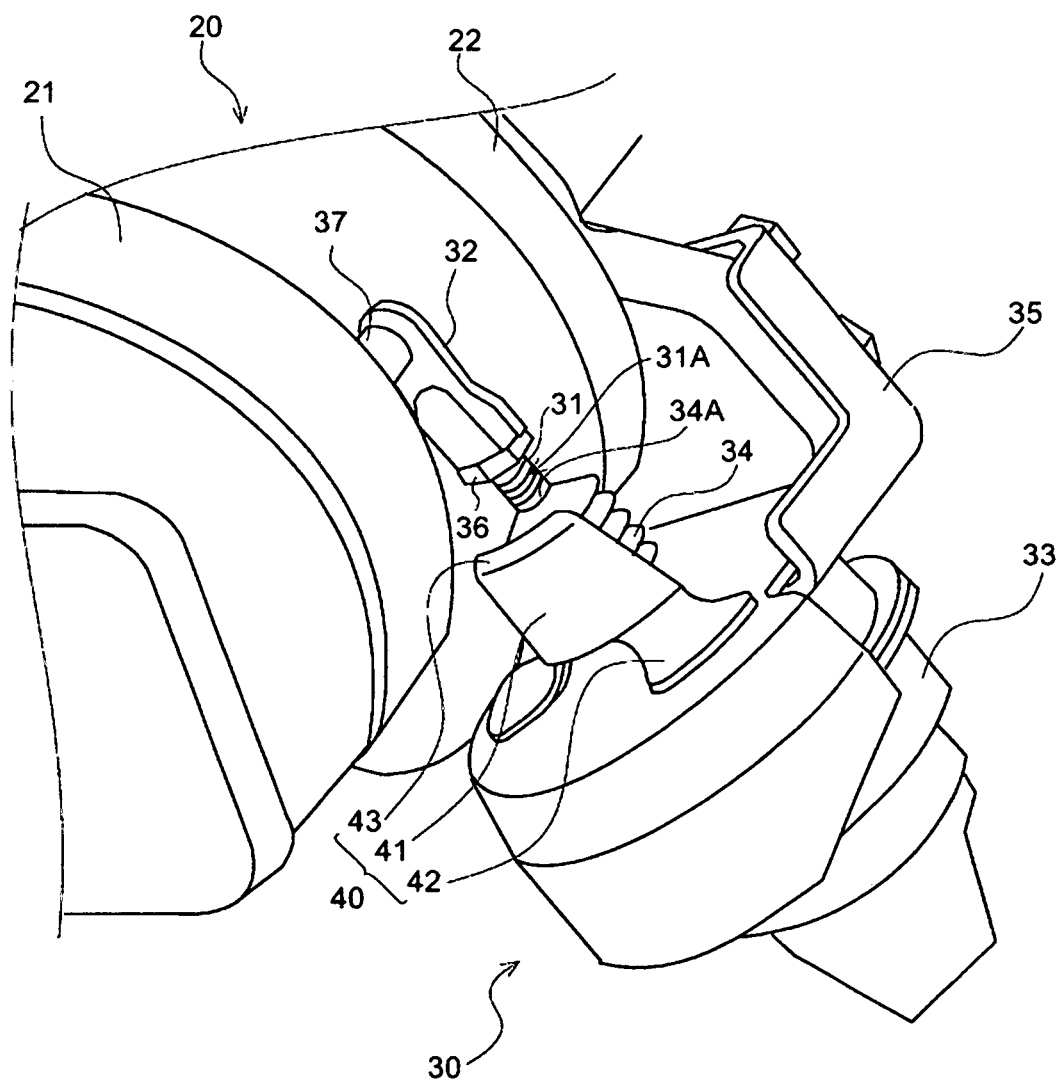
FIG. 2 is a schematic perspective view illustrating the actuator and the turbocharger according to the first embodiment.

As illustrated in FIGS. 1 and 2, a turbocharger 20 is a so-called variable displacement turbocharger, and includes a turbine housing 21 for accommodating a turbine (not illustrated) that is driven by exhaust gas, a compressor housing 22 for accommodating a compressor (not illustrated) that is arranged on the same axis as the turbine and pressure-feeds intake air, and a variable geometry nozzle (not illustrated) that is arranged in the turbine. The variable geometry nozzle is actuated by an actuator 30 to be described below.

The actuator 30 includes a rod member 31, a turnbuckle 32 that is screwed to a male screw part 31A of the rod member 31 and is coupled to the variable geometry nozzle (not illustrated) via a link mechanism 37, a case member 33 including a bearing part (not illustrated) that slidably and axially supports a base end side of the rod member 31, a stretchable boot 34 that is formed of an elastic member such as rubber and covers a sliding part (gap) of the rod member 31 and the bearing part of the case member 33, a substantially L-shaped bracket 35 for fixing the rod member 33 to the compressor housing 22, and a thermal shield covering member 40 for protecting the rod member 34. A nut 36 that functions as a rotation stopper of the turnbuckle 32 is screwed to the male screw part 31A of the rod member 31.

Inside of the case member 33 is partitioned into a high pressure chamber and a low pressure chamber by a diaphragm (not illustrated) fixed to a base end part of the rod member 31, and a return spring (not illustrated) for biasing the diaphragm toward the high pressure chamber is accommodated in the low pressure chamber. When operating pressure is introduced into the high pressure chamber, the diaphragm moves toward the low pressure chamber, and the rod member 31 is pulled back into the case member 33; when the operating pressure is released from the high pressure chamber, the diaphragm returns to the high pressure chamber via the return spring, and the rod member 31 is pushed out from the case member 33. The actuator 30 is not limited to a pneumatic or hydraulic type, and may be an electric type etc.

In the present embodiment, the actuator 30 is attached to be adjacent to the turbocharger 20, and the rod member 31 and a tip end side of the boot 34 are inserted between back surfaces of the turbine housing 21 and the compressor housing 22 that face each other.

The thermal shield covering member 40 protects the boot 34 from the turbine housing 21 of high temperature due to the exhaust gas, and is preferably formed of a thermal shielding material such as stainless steel or a cold rolled steel plate (SPCC). Specifically, the thermal shield covering member 40 includes a thermal shielding vertical wall part 41 formed in a semi-cylindrical shape having a substantially arc cross section, a fixing flange part 42 bent at a substantially right angle from the base end part of the thermal shielding vertical wall part 41 to an outer periphery side thereof, and a thermal shielding flange part 43 formed by curving a tip end part of the thermal shielding vertical wall part 41 to an inner periphery side thereof.

The fixing flange part 42 is fixed to an upper surface of the case member 33 by a screw etc. (not illustrated). The thermal shielding vertical wall part 41 is inserted between the back surface of the turbine housing 21 and an outer peripheral surface of the boot 34, and has a length longer than a maximum length of the boot 34. The thermal shielding flange part 43 is curved in a substantially arc shape from the tip end part of the thermal shielding vertical wall part 41 toward a rod connection opening part 34A of the boot 34, so as to cover the tip end side of the boot 34 that faces the turbine housing 21. That is, by covering the outer peripheral surface and the tip end side of the boot 34 that face the turbine housing 21 of high temperature due to the exhaust gas with the thermal shielding vertical wall part 41 and the thermal shielding flange part 43, heat transfer from the turbine housing 21 to the boot 34 is effectively blocked.

As described above in detail, according to the present embodiment, heat transfer from the turbine housing 21 to the boot 34 can be effectively blocked by disposing the thermal shield covering member 40 between the boot 34 and the turbine housing 21 of high temperature due to the exhaust gas. Accordingly, thermal degradation of the boot 34 of the actuator 30 that is arranged to be adjacent to the turbine housing 21 can be effectively prevented.

The boot 34 is protected by the thermal shield covering member 40, and thus the bracket 35 for fixing can be shortened as compared with the conventional structure, such that the actuator 30 can be attached to be adjacent to the turbocharger 20, and engine mountability of the turbocharger 20 can be improved reliably.

Second Embodiment

Figure 3:
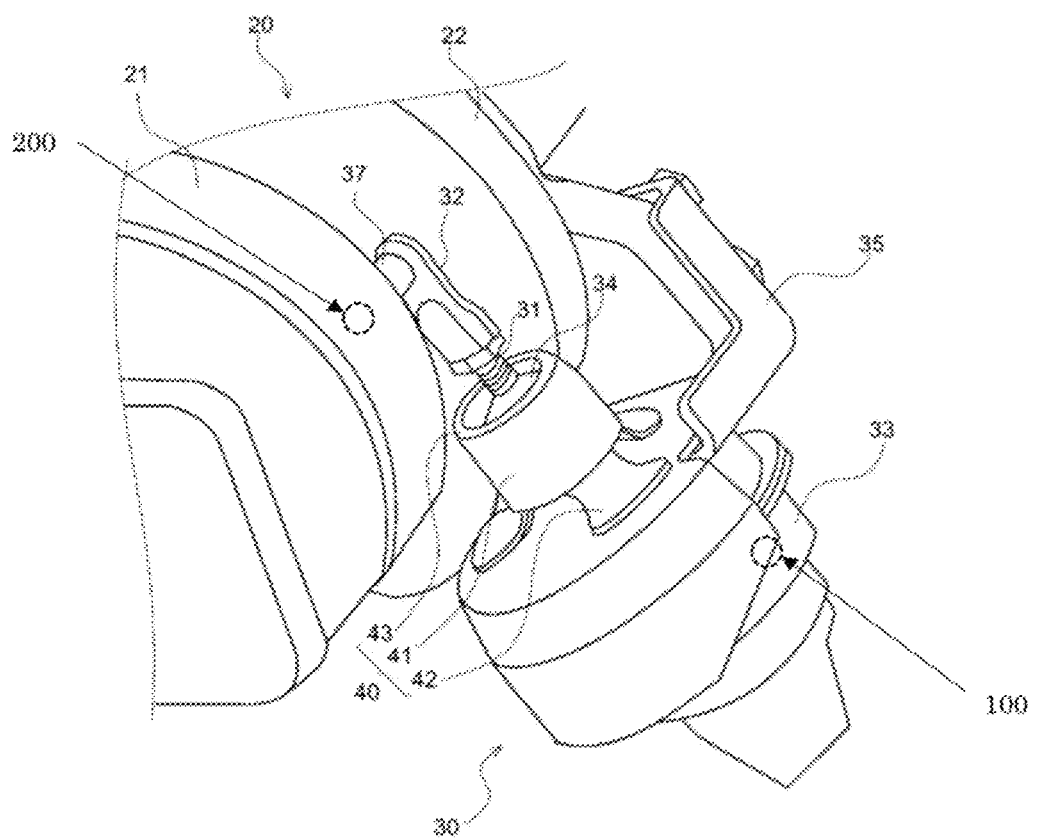
FIG. 3 is a schematic perspective view illustrating an actuator and a turbocharger according to a second embodiment.

As shown in FIG. 3, the actuator 30 according to a second embodiment is configured such that the thermal shielding vertical wall part 41 in the first embodiment is formed in a cylindrical shape, and the entire outer peripheral surface of the boot 34 is covered with the thermal shield covering member 40.

Accordingly, by covering the entire outer peripheral surface of the boot 34 with the thermal shield covering member 40, heat transfer from the turbine housing 21 to the boot 34 is effectively blocked as in the first embodiment, heat transfer from the compressor housing 22 to the boot 34 is also effectively blocked, and thermal degradation of the boot 34 can be reliably prevented.

The present disclosure is not limited to the above embodiments, and can be appropriately modified and practiced without departing from the spirit of the present disclosure.

Figure 4:
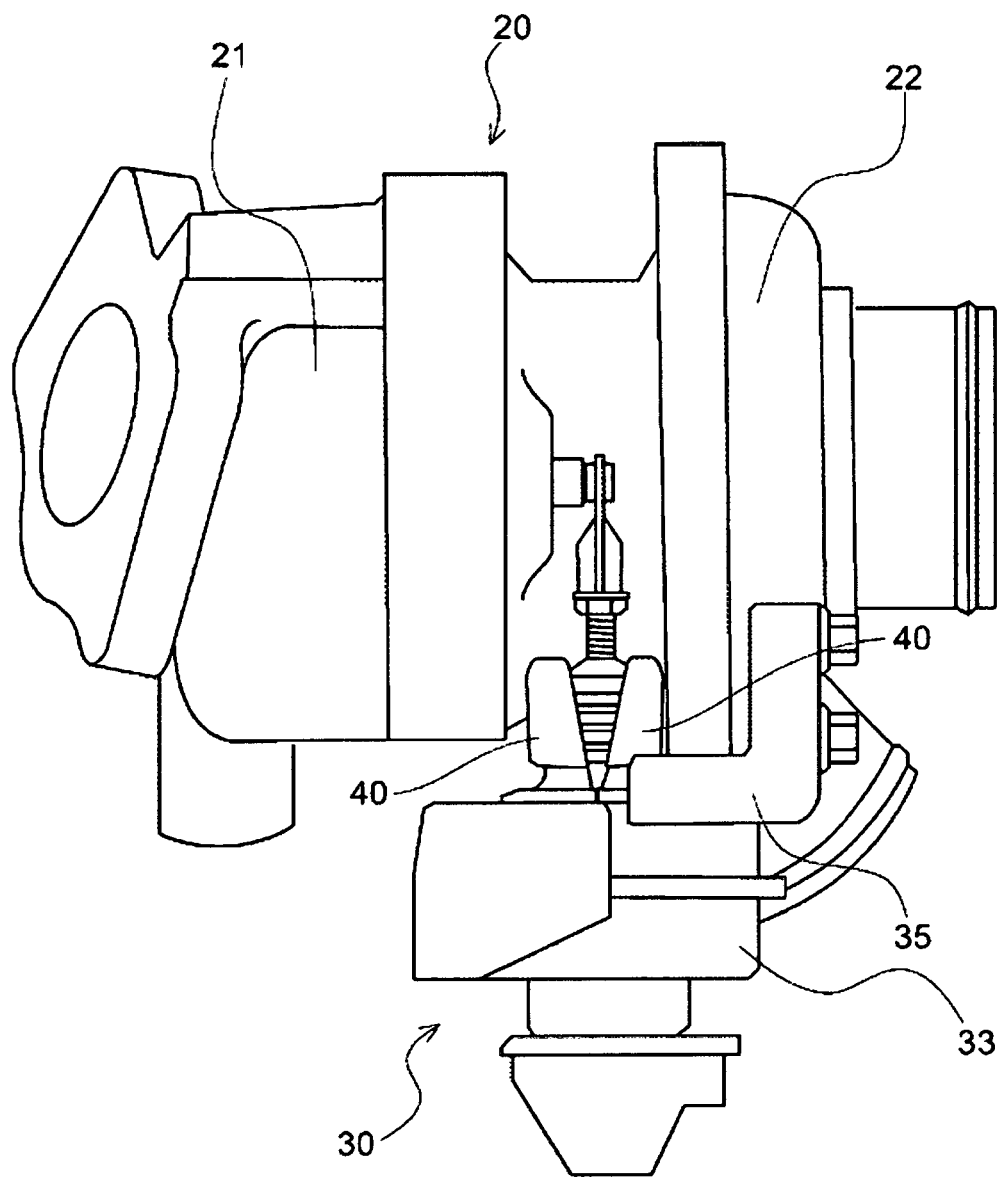
FIG. 4 is a schematic side view illustrating an actuator and a turbocharger according to another embodiment.

For example, as shown in FIG. 4, in the first embodiment, the thermal shield covering member 40 may be arranged not only between the turbine housing 21 and the boot 34 but also between the compressor housing 22 and the boot 34. In this case, heat transfer from the compressor housing 22 to the boot 34 can also be effectively blocked as in the second embodiment, and thermal degradation of the boot 34 can be reliably prevented.

Further, although the bracket 35 for fixing is described as mounting the case member 33 to the compressor housing 22, the case member 33 may also be fixed to the turbine housing 21.

Further, the actuator 30 is not limited to actuating the variable geometry nozzle of the turbocharger 20, and may also be configured to, if disposed to be adjacent to the turbocharger 20, actuate such as a variable geometry nozzle or a wastegate valve for controlling exhaust gas flowing in the turbine housing of the turbocharger. such as a wastegate valve.

The present application is based on a Japanese patent application (No. 2016-030425) filed on Feb. 19, 2016, contents of which being incorporated herein by reference.

INDUSTRIAL APPLICABILITY

The present disclosure is useful in that thermal degradation of the boot of the actuator can be effectively prevented.

LIST OF REFERENCE NUMERALS 20 turbocharger
21 turbine housing
22 compressor housing
30 actuator
31 rod member
32 turnbuckle
33 case member
34 boot
35 bracket
40 thermal shield covering member
41 thermal shielding vertical wall part
42 fixing flange part
43 thermal shielding flange part

The invention claimed is:

1. A turbocharger system comprising:
a turbocharger that includes:
    a turbine housing configured to accommodate a turbine driven by exhaust gas;
    a compressor housing configured to accommodate a compressor disposed on a same axis as the turbine and pressure-feeding intake air; and
    a link mechanism for controlling a variable geometry nozzle of the turbocharger; and
an actuator that includes:
    a rod configured to be coupled to the link mechanism one end side;
    a case member configured to slidably and axially support another end side of the rod via a bearing;
    a boot configured to cover a sliding part of the rod and the bearing such that at least a part of an outer peripheral surface of the boot faces an outer peripheral surface of the turbine housing; and
    a thermal shield member configured to be disposed between the turbine housing and the boot,
    wherein the thermal shield member includes:
        a thermal shield vertical wall part configured to cover the outer peripheral surface of the boot facing at least the turbine housing; and
        a thermal shielding flange part formed by curving a tip end part of the thermal shielding vertical wall part to an inner periphery side of the thermal shielding vertical wall part, the thermal shielding flange part configured to cover a tip end side of the boot,
    wherein the thermal shield vertical wall part is formed in a cylindrical shape to cover all of the outer peripheral surface of the boot.

2. The turbocharger system according to claim 1, wherein the link mechanism and the rod is disposed between the turbine housing and the compressor housing.

3. The turbocharger system according to claim 1, further comprising:
a bracket for fixing the case member to the compressor housing.

* * * * *